June 30, 1936.  J. LUNDGREN  2,046,294
APPARATUS FOR BALANCING ROTATABLE BODIES
Filed May 16, 1931   8 Sheets-Sheet 6
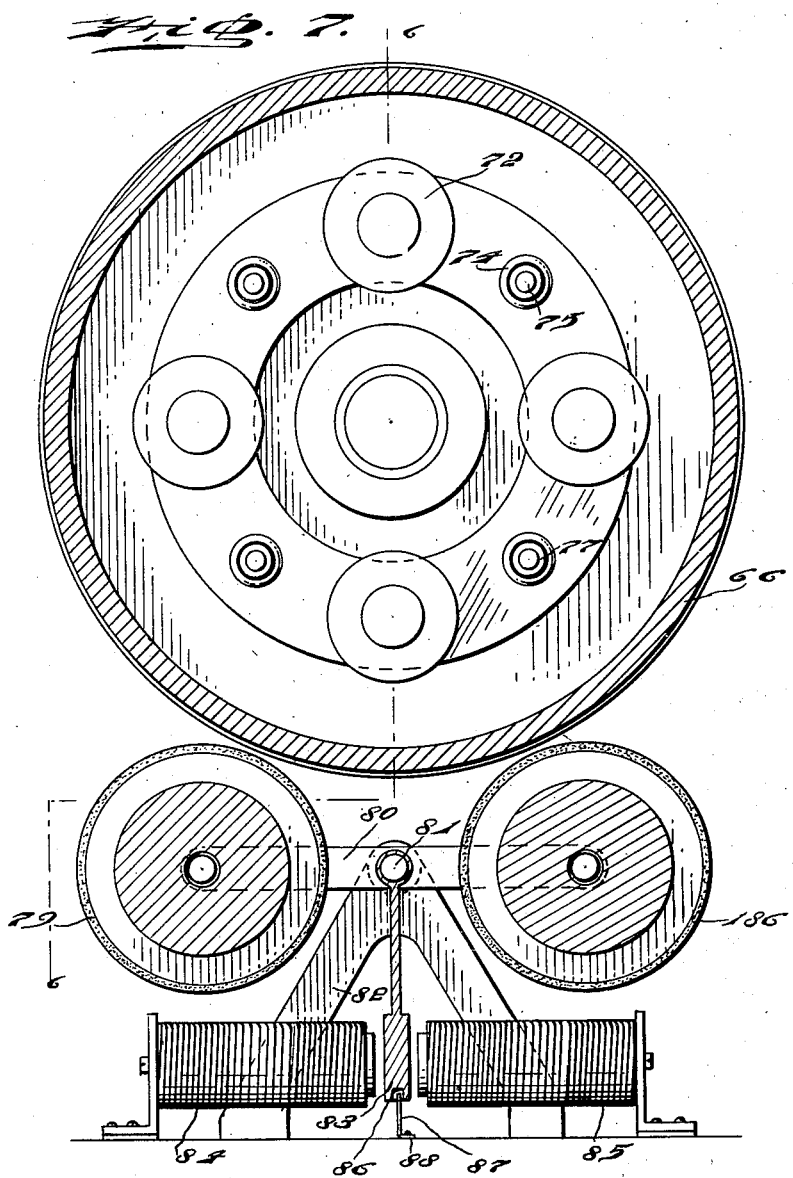
INVENTOR.
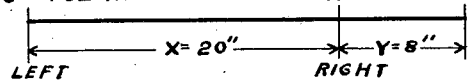
BY
*Herbert S. Fairbanks*
ATTORNEY.

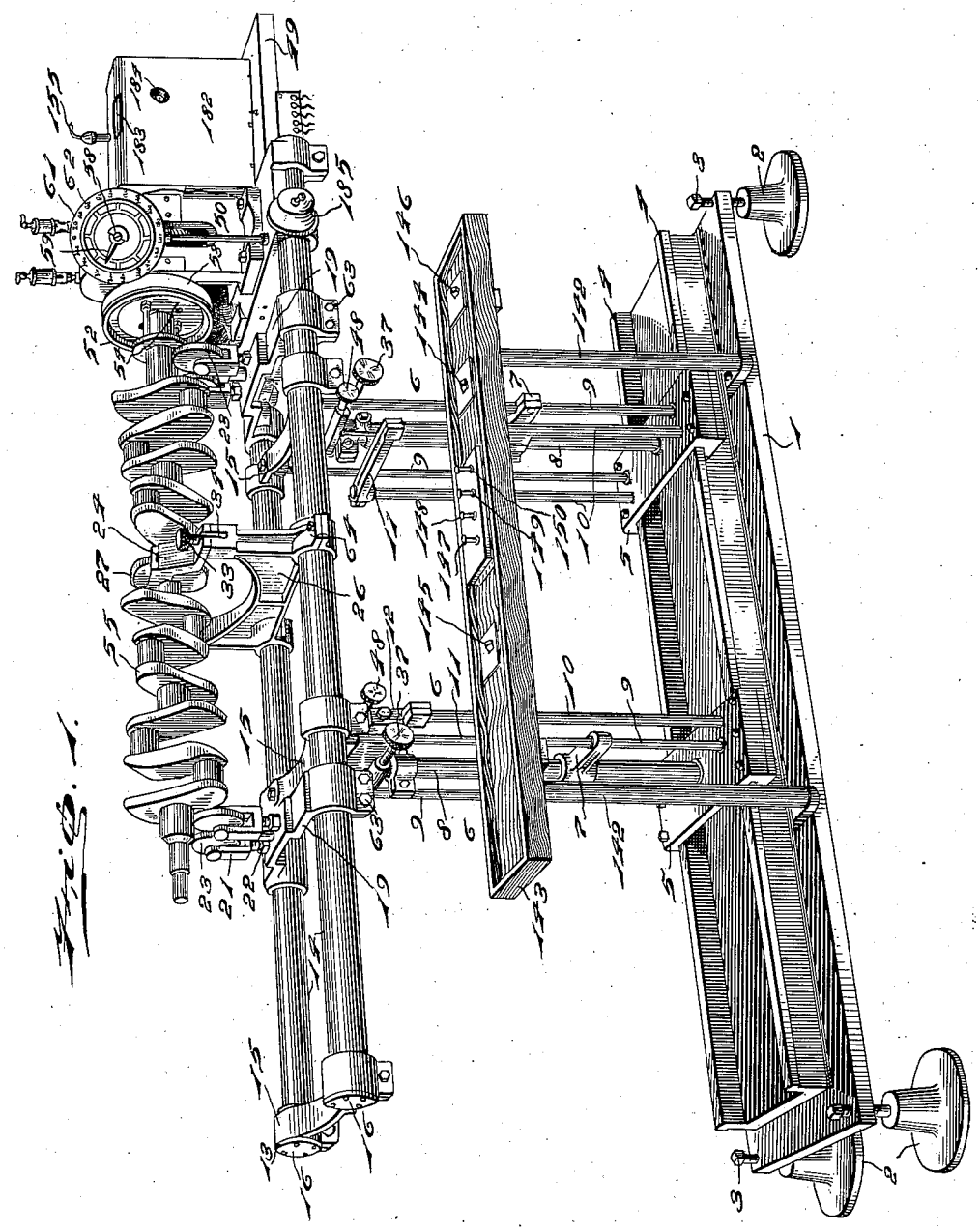

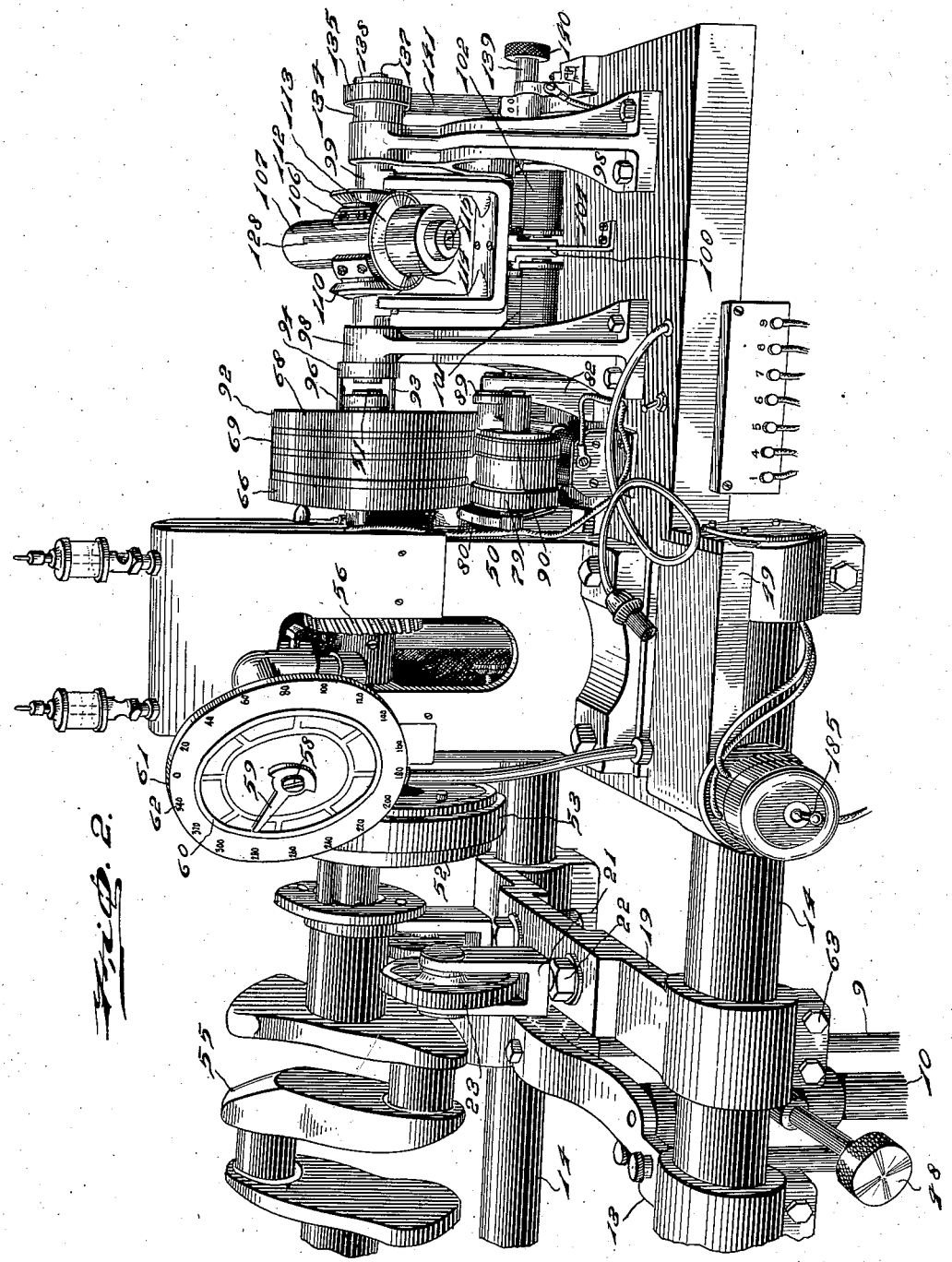

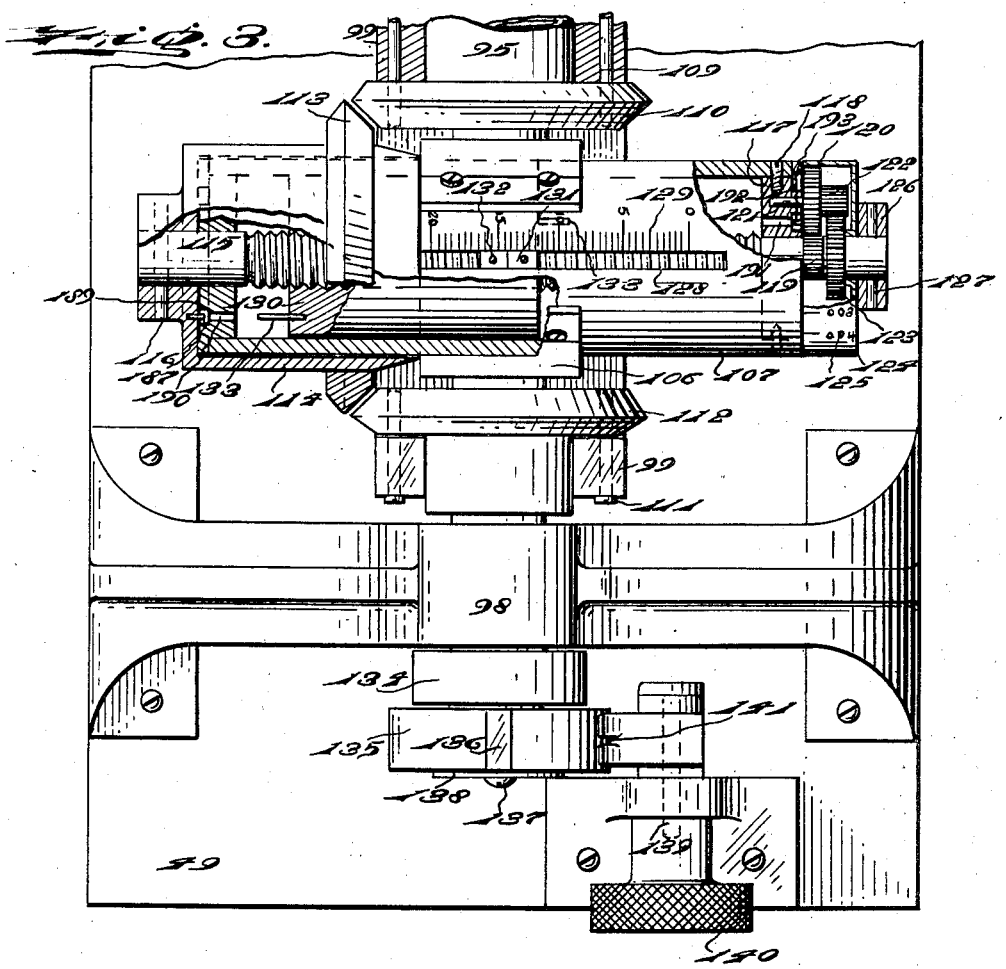
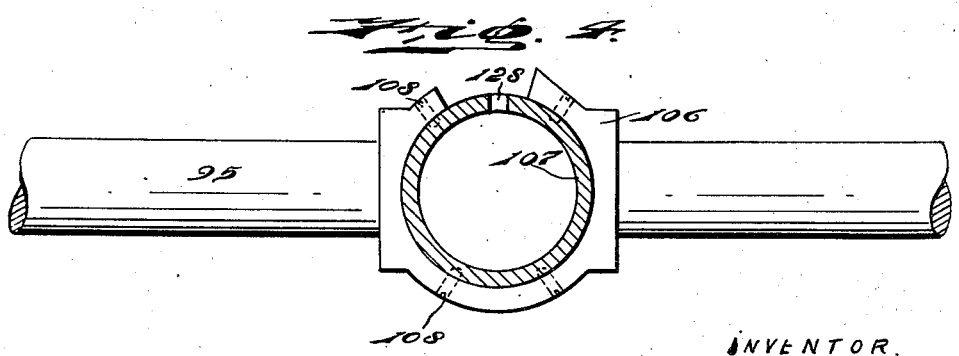

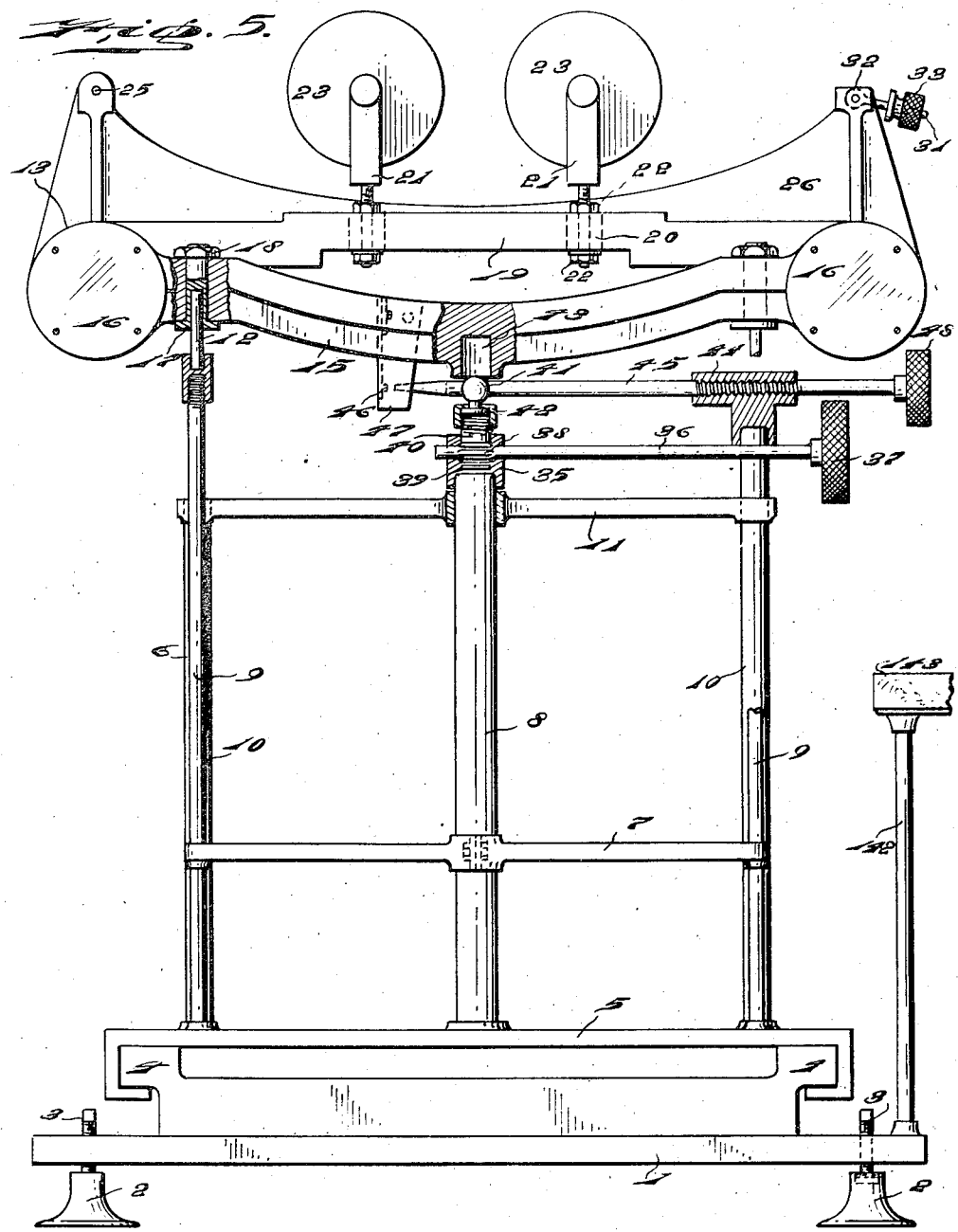

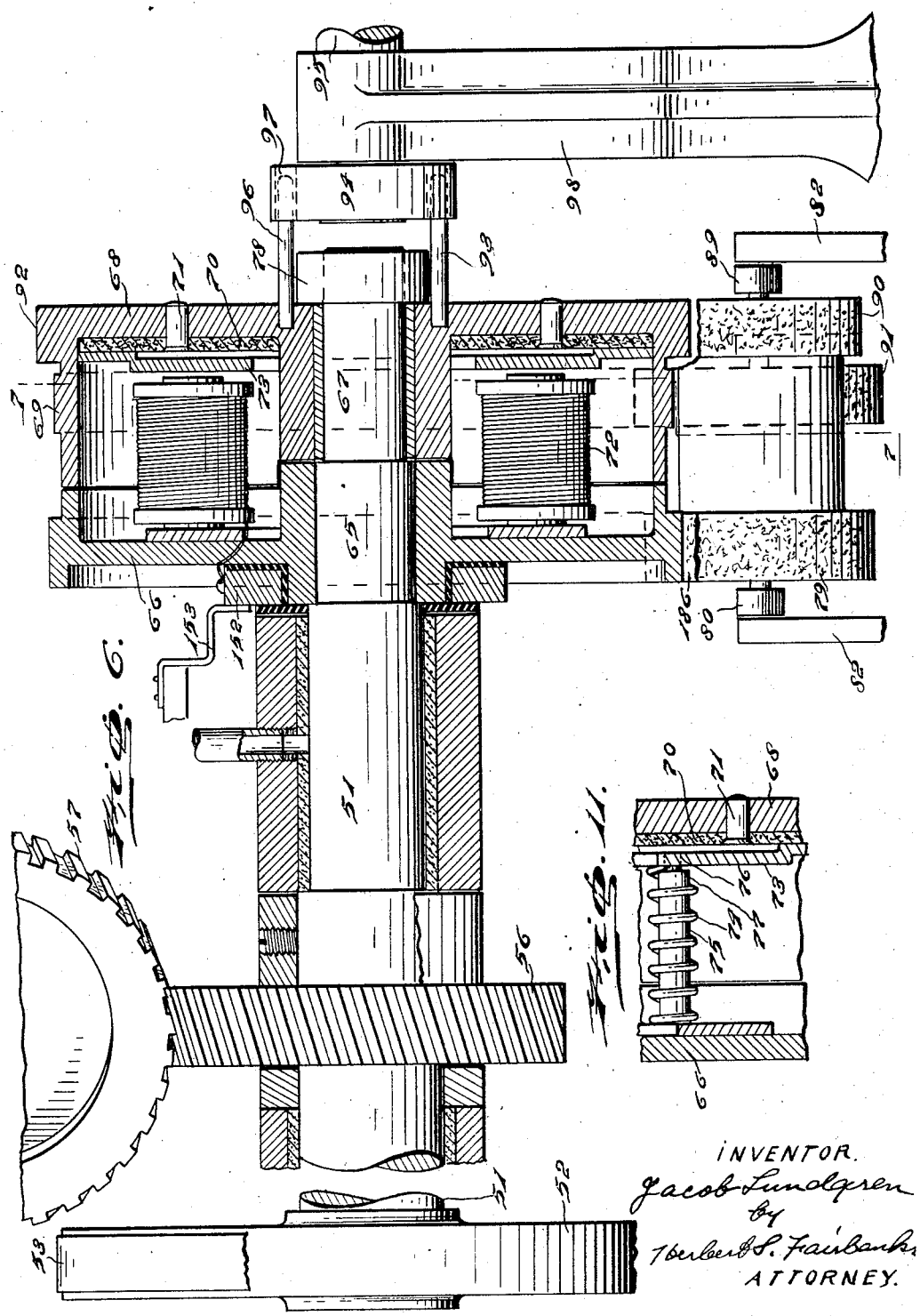

June 30, 1936.  J. LUNDGREN  2,046,294
APPARATUS FOR BALANCING ROTATABLE BODIES
Filed May 16, 1931  8 Sheets-Sheet 7
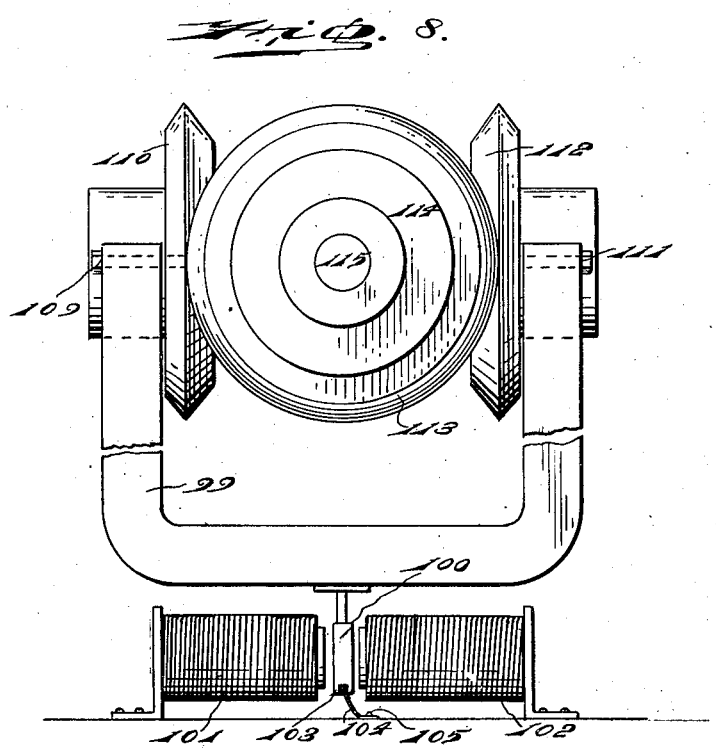
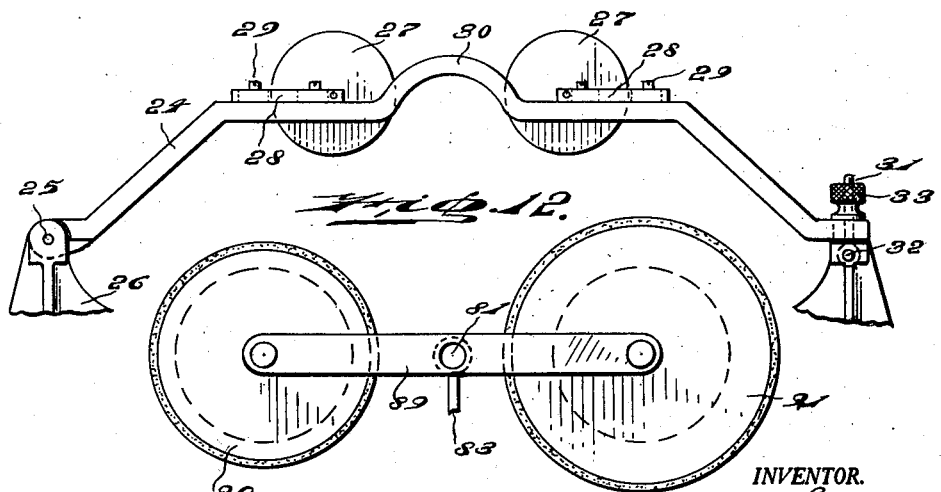
INVENTOR.
Jacob Lundgren
BY
Herbert S. Fairbanks
ATTORNEY.

Patented June 30, 1936

2,046,294

UNITED STATES PATENT OFFICE 2,046,294

APPARATUS FOR BALANCING ROTATABLE BODIES

Jacob Lundgren, Philadelphia, Pa., assignor to Tinius Olsen Testing Machine Company, Philadelphia, Pa., a corporation of Pennsylvania Application May 16, 1931, Serial No. 537,848

11 Claims. (Cl. 73—51)

The object of this invention is to devise a novel apparatus for balancing rotatable bodies wherein a centrifugal high-tension spark principle is employed, and wherein the angular indication, as well as the amount of unbalance, are taken while the machine is in operation. All readings for unbalance are taken without reversing the part to be balanced in the balancing machine.

A further object of the invention is to devise novel compensating means for the unbalance of the specimen which is electrically controlled and positioned at the will of the operator to determine the amount of unbalance, the angle of unbalance being also determined and visibly indicated on a graduated angle indicator.

A further object of the invention is to devise a novel balancing machine which can be operated at a constant definite speed differing from critical speed, thereby eliminating the necessity of maintaining critical speed or passing through critical speed.

A further object of the invention is to devise a novel balancing machine which will operate at a comparatively low speed, and thereby permit the accurate determination of unbalance while holding to a minimum the centrifugal forces which might deflect the parts being balanced.

With the above and other objects in view, as will hereinafter more clearly appear, my invention comprehends a novel apparatus for balancing rotatable bodies.

It further comprehends a novel balancing machine wherein provision is made for electrically positioning, at the will of the operator, a compensator weight to compensate for the unbalance in a specimen under test, the machine being so constructed that at the same time it will visibly indicate the angle of unbalance, so that the angle and amount of unbalance in two different planes of the specimen can be determined without reversing its position in the balancing machine.

It further comprehends novel guiding means for the specimen to prevent any error in balancing due to deflection or misalignment of the part which is to be balanced.

It further comprehends a novel apparatus for determining the amount and angular location of unbalance at each end of a specimen under test while it is revolving continuously at a constant speed.

It further comprehends a novel construction and arrangement of adjustable supports for the specimen.

It further comprehends a novel wiring diagram.

Other novel features of construction and advantage will hereinafter more clearly appear in the detailed description and the appended claims.

For the purpose of illustrating the invention I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a perspective view of a balancing machine embodying my invention.

Figure 2 is a perspective view of the machine, viewed from a different angle to that of Figure 1.

Figure 3 is a top plan view, partly broken away and partly in section, showing more particularly the compensating means.

Figure 4 is an end view, partly in section, showing more particularly the manner in which the housing of the compensating means is revolubly carried by a shaft.

Figure 5 is an end elevation of a portion of the machine, certain of the parts being broken away for the sake of clearness of illustration.

Figure 6 is a sectional elevation, the section being taken substantially on line 6—6 of Figure 7.

Figure 7 is a section on line 7—7 of Figure 6.

Figure 8 is a front elevation of certain portions of the compensating mechanism.

Figure 9 is a side elevation of the guiding mechanism for a specimen.

Figure 11 is a sectional view of a portion of Figure 6.

Figure 12 is a side elevation of a portion of Figure 6.

Figure 13 is a reading diagram.

Similar numerals of reference indicate corresponding parts.

Referring to the drawings:—

Figure 10:
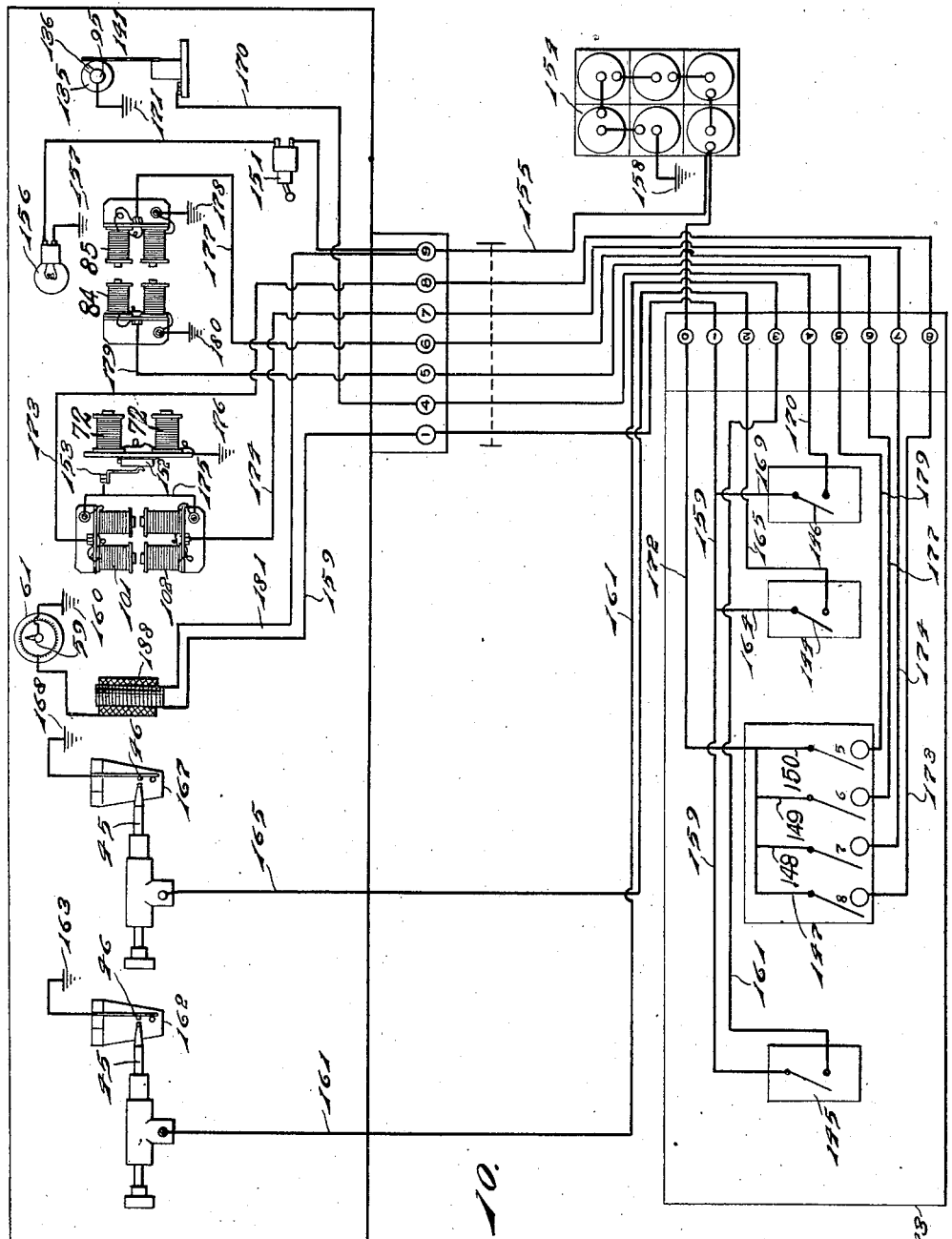
Figure 10 is a wiring diagram.

1 designates the base of a balancing machine embodying my invention. The machine can be placed directly on a floor, as free as possible from vibration, or on a cement foundation and can be bolted down to the foundation, or it can be provided with support pads 2, and levelled by set screws 3, provided at the four corners of the base. The base 1 is provided with the longitudinally extending front and rear guides 4, on which the base plates 5 of vertical spring supports 6 are longitudinally adjustable.

I provide two vertical spring supports, the natural vibration period of which can be adjusted by raising or lowering the cross bar 7 which is slidably mounted on a central post 8 and the front and rear vibrating rods 9. Posts 10 rising from the base plate 5 are connected with the central post 8 by an upper brace member 11. Each spring support 6 is provided with two of the upwardly extending vibration rods 9, fixed to their base plate 5, and connected by means of rods 12, to a rigid frame 13, which is formed by the side rods 14, connected together by the cross bars 15. The rods 14 are tubular and their free ends are preferably covered by the caps 16, secured to the frame in any desired manner. The rods 12 extend into the apertures in the bolts 17 which pass through the cross bars 15 and are fixed in position by means of nuts 18. The rods 14 of the rigid frame have longitudinally adjustable on them the roller supporting cross bars 19, in which the shoes 20 of the roller brackets 21 are adjustable. The brackets 21 are fixed in their adjusted position by nuts 22. The brackets 21 carry the rollers 23 which are free to revolve and serve as bearings for supporting the specimen which is to be tested.

In many cases, the parts or specimens to be balanced can be balanced on two bearings, but, in some cases, it is advantageous to employ a center guide to insure against error in balancing, due to deflection or misalignment of the part to be balanced. Some classes of work, such as, straight-line-8 type crank shafts, long rolls for printing presses or paper machines, and similar parts, may change their shape and become misaligned while being handled during the manufacturing process or during transportation. If such misaligned parts are tested for balance while only supported on two bearings, accurate and true balancing may be difficult or impossible. The same condition exists when the part to be balanced is structurally weak and is supported in only two bearings during the balancing operation. I have, therefore, found it advantageous in many cases to provide a center guide in the form of a bar 24 which is pivotally mounted at one end as at 25, to the upwardly extending rear portion of a bracket 26 which is provided with collars slidably mounted on the rods 14 of the rigid frame. Guide rollers 27, journalled in blocks 28, are relatively adjustable on the upper horizontal stretch of the bar 24 and are secured in fixed position by means of fastening devices 29 of any desired character. The bar 24 at its central portion is preferably upwardly deflected, as at 30, in order to provide proper clearance between it and the specimen which is to be tested. The free end of the bar 24 is slotted to receive the threaded rod 31 which is pivoted at 32 to an upward extension to the front end of the bracket 26 and a knurled nut 33 is provided to retain the bar 24 in its adjusted position. As shown in Figure 1, the upwardly extending portion of the bracket 26 is also slotted as at 34, in order to permit the threaded rod 31 to swing downwardly and free the bar 24 when it is desired to raise such bar.

Each of the spring supports 6 is provided with means to lock the rigid frame so that it will have a pivotal connection at either the right or left hand end of the machine. As this locking mechanism is the same at each end, a detailed description of one will suffice for both. The post 8 carries at its upper end a gear case 35, see Figure 5, in which is journalled a shaft 36 provided with an actuating handle 37 and with a pinion 38 which meshes with a rack 39 on a rod 40 which carries a ball shaped pivot member 41 which is flanged at its bottom and secured to the rod 40 by means of a cap nut 42 in threaded engagement with such rod 40. The juxtaposed cross bar 15 of the rigid frame is provided with an aperture 43 opening through its bottom into which the pivot member 41 may extend. No claim is made in this case to the pivot locking means as this is claimed in my copending application, Serial 620,258, filed June 30, 1932.

One of the posts 10, of each spring support unit 6, is provided with a fitting 44, with which a contact rod 45 is in threaded engagement, the forward end of said rod forming a movable contact which cooperates with a spring contact 46 carried by a stop 47, depending from a cross bar 15. The contact rod 45 is provided with an actuating handle 48.

The rods 14 have slidably mounted on them a base plate 49 which carries a casing 50 within which a shaft 51 is journalled, see Figure 6, said shaft having fixed to it a pulley 52 around which passes a belt 53, said belt also passing around a pulley on the shaft of an electric motor, not shown. This pulley is provided with a face plate 54 adapted to be connected in any desired manner with the specimen 55 which is to be revolved. As shown, the face plate is connected by driving pins with a flange on the crank shaft. As illustrated, I have shown the specimen under test as being a crank shaft for an internal combustion engine, it being of course understood that any desired type of specimen which can be received on the roller bearings can be tested in the type of machine here under discussion.

The shaft 51, see Figure 6, has mounted on it a spiral gear 56 which meshes with a spiral gear 57, suitably supported and operatively connected with a dial shaft 58, see Figure 2, to effect the revolution of a dial hand 59 so that this dial hand 59 revolves at a predetermined speed relative to the speed of revolution of the specimen 55 which is being tested. The dial hand 59 has its free end in proximity to a metallic ring 60 fixed to an insulating member 61 which is graduated in degrees as at 62. As the graduated dial, the dial hand, and the drive for the dial hand is substantially the same as that shown in my prior Patent 1,860,257, May 24, 1932, I have deemed it unnecessary to describe in detail this construction as my present invention is more particularly directed to the novel compensating device and its control.

The cross bars 19 are provided with split collars slidable on the rods 14 and are clamped in their adjusted position by means of fastening devices 63. In a similar manner the bracket 26 is fixed in its adjusted position by means of fastening devices 64, the collars being split and clamped together by such fastening devices.

The compensating mechanism

The motor driven shaft 51, see Figure 6, is provided with a reduced diameter 65 on which is fixed the hub of a friction wheel 66. It is also provided with a reduced diameter 67 on which is loosely mounted the hub of a friction wheel 68 which is of greater diameter than the diameter of the friction wheel 66, the purpose being to obtain a variable friction drive for the compensating mechanism. The friction wheel 68 is also provided with an annular friction face 69 which is of less diameter than the diameter of the friction wheel 66. The friction wheel 68 is provided with an inner facing of friction material 70 secured thereto by fastening devices 71. The friction wheel 66 has secured thereto the electromagnets 72 which are circumferentially spaced from each other, four of these electromagnets being employed as will be understood by reference to Figure 7. The armature 73 of the electromagnets is adapted at its outer marginal portion to engage the friction face formed by the material 70, and this engagement is maintained due to the provision of the springs 74 which encircle the studs 75 which are secured to the friction wheel 66. These studs at their free ends are of reduced diameter and pass through the apertures 76 in the armature 73, and shoulders 77 are formed on these studs which limit the movement of the armature 73 towards the poles of the electromagnets 72. The friction wheel 68 is retained in assembled position on the shaft 51 by means of a collar 78. A pair of friction wheels 79 and 186 are adapted to cooperate with the friction wheel 66. These friction wheels 79 and 186 are loosely mounted at opposite ends of a cross bar 80 which is fixed on a rock shaft 81, carried by one of the brackets 82. The rock shaft 81 has fixed to it the armature 83 which cooperates with the opposed electromagnets 84 and 85, see Figure 7. The armature 83, at its lower end, is provided with a recess 86 into which the free end of a spring 87 extends, the opposite end of said spring being secured by fastening devices 88 to the base plate 49 which carries the compensating mechanism and is provided with collars clamped on the rods 14. The rock shaft 81 has also fixed to it a bar 89 which carries the front friction roller 90 and the rear friction roller 91, see Figures 6 and 12, the roller 90 cooperating with the friction face 92, of the friction wheel 68, while the roller 91 cooperates with the friction face 69, of the friction wheel 68, it being noted that these friction wheels are offset from each other. The friction wheels 79 and 90 are connected by a common hub to rotate in unison, and in a similar manner the friction wheels 186 and 91 are connected by a common hub to rotate in unison.

The friction wheel 68 is provided with a pin 93 secured to it and extending into a recess larger than such pin, in a collar 94, on a shaft 95, suitably journalled. A second pin 96 is also preferably employed fixed to the friction wheel 68 and passing into an enlarged aperture 97 in the collar 94 so that the pin 93 is counterbalanced.

It will be understood that I employ two electromagnets 84 and two electromagets 85. When the electromagnets 84 are energized the friction wheels 79 and 90 are brought into engagement with their respective friction wheels 66 and 68, and when the electromagnets 85 are energized the friction wheels 186 and 91 will be brought into frictional engagement with the friction wheels 66 and 68 respectively.

The shaft 95 is journalled in bearings 98, see Figure 2, and loosely mounted on this shaft is a yoke 99, see Figures 2, 3 and 8, and this yoke has depending from it the plate armature 100 which cooperates with the opposed electromagnets 101 and 102, there being two electromagnets 101 and two electromagnets 102. The armature 100 is recessed at its lower end as at 103, to receive the free end of a spring 104 which is secured by means of fastening devices 105 to the base plate 49. The shaft 95 is provided with a coupling 106 in which is fixed a carrier 107 so that the latter will revolve in unison with the revolution of the shaft 95 and this carrier is fixed in position by means of the fastening devices 108, see Figure 4.

One arm of the yoke 99 has fixed to it, by means of fastening devices 109, a bevelled friction driving wheel 110. In a similar manner the other arm of the yoke has fixed to it, by means of fastening devices 111, a beveled friction driving wheel 112. These wheels 110 and 112 are adapted to be moved into engagement at the will of the operator with a bevelled friction wheel 113 which is fixed to a cap sleeve 114 provided with a hub in which one end of a screw 115 is fixed by means of a pin 116. The opposite end of this screw 115 is journalled in an end closure 117 closing the end of the cylinder which forms the carrier 107 and fixed therein by means of fastening devices 118. The screw 115 has fixed to it a gear 119 which meshes with a gear 120 fixed on a stud shaft 121, said stud shaft having also fixed on it a gear 122 which meshes with a gear 123, on the hub of a cap 124 which is journalled on the screw 115. The cap 124 is graduated as at 125, around its periphery. A collar 126 is fixed to the screw 115 by means of a pin 127 and retains the cap 124 in position. It will be understood that the cylinder 107 is in fixed relation with the shaft 95 and it is provided with a slot 128 and along one side of this slot are the graduations 129.

130 designates a compensating weight to which is fixed a shoe 131 which travels in the slot 128 and is provided with a single graduation 132 which is adapted to be brought into registration with the graduations 129 during the operation. The compensating weight at opposite ends has the projecting pins 133 which limit the travel of the compensating weight 130 in either direction by contacting with stops 187 and 193. The stop 187 is carried by the hub of the cap sleeve 114 and extends into a grooved collar 189 similar to the collar 117 and closing one end of the carrier 107. The collar 189 is provided with an aperture 190 into which the juxtaposed pin 133 may pass into the path of the stop 187. At the opposite end of the carrier 107 the collar 117 is provided with an aperture 191 through which the juxtaposed pin 133 of the compensating weight 130 may pass into the annular groove 192 into which extends the stop 193 carried by the gear 120. This weight 130 is in threaded engagement with the screw 115.

The shaft 95, see Figure 3, has fixed to it a collar 134 against which is adapted to be fixed an insulating collar 135 having in its periphery a contact 136. This insulating collar 135 is secured in position by means of a set screw 137 which is in threaded engagement with the shaft 95, a suitable washer 138 being provided. A screw 139 is in threaded engagement with an actuating handle 140 and is mounted on the base plate 49. This screw 139 passes through the base of a spring contact blade 141 which bears against the periphery of the insulating collar 135, so that during each revolution of the shaft 95 contact will be made with the contact 136. By loosening the screw 137 the position of the contact 136 can be circumferentially adjusted.

It will be seen from Figure 1 that the base 1 of the machine has rising from it the standards 142 which carry the table 143 on which are mounted the electrical controls. 144 is the spark switch which is used when the left end of the vibratory bed is locked and the right end is free to vibrate, and 145 is the spark switch when the right end of the vibratory bed is locked and the left end is free to vibrate. 146 is a switch for causing a very narrow arc of sparks to appear on the dial 61 when the contact 136 is engaged with contact spring 141. This indicates the angular position of the compensating weight. 147 and 148 are switches for controlling the angular movement of the weight 130, and the switches 149 and 150 are the switches for controlling the linear movement of the compensating weight 130. 151, see Figure 10, is a switch for an electric light 156. The friction wheel 66 has a collector ring 152 secured to it but insulated from it. A contact 153 bears against the collector ring 152.

The electrical controlling system

The manner in which the balancing machine is electrically controlled, at the will of the operator, to determine the unbalance in a specimen being tested and the proper correction for such unbalance in two selected planes of correction, will be understood, by reference more particularly, to the wiring diagram shown in Figure 10, which will now be explained.

154 designates a source of electric supply from which leads a line 155 to the lamp 156, containing the light switch 151, grounded at 157. The source of electric supply 154 is grounded at 158.

The switch 145 is in a line 159 which leads to the primary winding of the high tension coil 188 the secondary winding of which is connected with the graduated ring of the angle indicator 61 and the dial hand 59 is grounded as at 160. The line 161 from the switch 145 leads to the contact mechanism 162 at the left hand end of the vibratory frame or bed of the machine and this contact mechanism is grounded as at 163. The switch 144 has a line 164 communicating with the line 159 which leads to the primary winding of the high tension coil 188 the secondary of which is connected with the angle indicator 61 as before explained, and the other line 165 from the switch 144 leads to the contact mechanism 167 at the right hand end of the vibratory frame, such contact mechanism being grounded at 168. The switch 146 has a line 169 communicating with the line 159 which leads to the primary winding of the high tension coil 188, the secondary of which is connected with the angle indicator 61 and also has a line 170 which leads to the contact arm 141 which cooperates with the revoluble contact 136 on the insulated collar 135. The contact 136 is grounded as at 171.

A line 172 leads from the source of electric supply 154 to one side of the switches 147, 148, 149 and 150. The other side of the switch 147 communicates by a line 173 with electromagnets 101. The switch 148 communicates by line 174 with the electromagnets 102, it being remembered that these electromagnets control the linear movement of the compensating weight 130, see Figures 8 and 3 while the angular setting is controlled by electromagnets 84 and 85. The electromagnets 101 and 102 are connected by line 175 with the contact 153 which rides on the collector ring 152 which passes current to electromagnets 72 which are grounded at 176. The switch 149 communicates by line 177 to the electromagnets 85 which control the angular setting of the screw 115 with respect to the rotation axis of the body being tested. These electromagnets 85 are shown grounded as at 178. The switch 150 communicates by line 179 to the electromagnets 84 which control the angular setting of the screw 115 and compensator weight 130 with respect to the rotation axis of the body being tested. These electromagnets 84 are shown grounded as at 180. The line 155 which leads from the source of electric supply 154 to the light also leads by line 181 to the primary winding of the high tension spark coil 188, the secondary of which leads to the angle indicator 61.

It will be seen from Figure 1 that the compensating mechanism is covered by a casing 182 having sight openings 183 and 184.

In Figure 13 I have shown diagrammatically a reading of the compensator. The graduations on the compensator indicate unbalance in ounce inches as measured at the compensator when the vibrating bed is locked at either support with the other end unlocked. The actual weights required for correction of the part to be balanced depend on the locations of the planes of such part where corrections are to be made. With either end of the vibrating bed locked on its pivot and with the other end unlocked, the compensator is adjusted for each end until it counterbalances the unbalance in the part being tested. Both readings on the compensator are assumed to be ounce inches and in this diagram it is assumed that corrections for unbalance are to be made in two planes located over the two pivots J and H and it has been assumed that in each case the unbalance reading is 10 ounce inches which is the product of weight and radius.

The operation will now be apparent to those skilled in this art and is as follows.

Before beginning the testing operation the roller supports 21 are adjusted so that the rollers 20 23 of each pair are adjusted to suit the diameters of bearings in the part to be balanced. They are then locked in position. The cross bars 19 are clamped to the rods 14 of the vibratory bed as are also the clamping devices 64 in case the center guide is employed. The specimen to be tested, such as, for example, the crank shaft illustrated in Figure 1, is now placed on the rollers as shown and connected with the driving pins of the face plate 54 which is in the form of an adapter ring so that the specimen is now in driving connection with the electric motor which drives the pulley 52 by means of the belt 53.

The present machine is designed to operate at a comparatively low speed which is different from the critical speed.

The normal vibrating period of the vibratory unit, with the specimen to be balanced in position and the spindle at rest, should be not less than 10% higher than the speed of rotation of the machine. The normal vibrating period is regulated by first touching the vibratory unit to cause it to vibrate naturally and then counting the number of vibrations over some given period of time by noting the frequency of sparking on the dial. Then raise or lower the cross bar 7, see Figures 1 and 5, until the natural period of vibration is at least 10% higher than the speed at which the machine will be operated. This setting of the cross bar 7 can vary as one setting will take care of some difference in weight of the specimen to be balanced without affecting the accuracy of readings for angular position of unbalance.

The next step is to adjust the spark contacts. This is done by locking one end of the machine on its pivot and releasing the opposite end by operating the knurled handles 37. Then operate the knurled handle 48 at the released end until the spark appears on the dial 61. Turn the same handle 48 rearwardly until the spark just disappears. The spark gap is thus adjusted for each contact mechanism in the same manner locking the pivot at one end and releasing it at the end at which the adjustment of the contact is to be made.

In accordance with this invention the unbalance in two planes of the specimen is determined without reversing or removing the specimen from the machine.

Assuming first that the right end reading is to be taken, the left end handle 37, see Figure 5, is locked so that the ball 41 is in the recess 43 and the pivotal connection at the right end is released so that the right end is now free to vibrate. The motor switch 185 is now actuated causing the specimen to revolve.

The switch 144 is now closed, closing the circuit through lines 165, 164 and 159, coil 188 and line 181 so that a series of sparks will appear on the dial hand 59 and the ring 60. The center of the arc of these sparks indicates the angular position of unbalance at the right end of the specimen under test. The switch 144 is now opened and the switch 146 closed. This closes the circuit through line 181, coil 188, lines 159, 169, 170, contact 136, and spring contact blade 141, and a very narrow arc of sparks appears on dial 61, the center of which indicates the angular position of the compensating weight 130. The angular position of the compensating weight is now shifted by operating alternately the two switches 147 and 148 which positions the compensating weight in one angular direction or the other until its position is such that the unbalance can be compensated by the compensating weight.

If the switch 147 is closed, the circuit is closed through lines 173, 172, thus energizing electromagnet 101 to cause friction wheel 112 to engage friction wheel 113 to revolve screw 115 and move the compensating weight in one linear direction in the carrier.

If the switch 148 is closed the circuit is closed through lines 174, 172 energizing electromagnets 102 which when energized causes friction wheel 110 to be moved into engagement with friction wheel 113 to revolve the screw 115 in the opposite direction and to move the compensating weight in a direction opposite to that in which it moved when switch 147 was closed. The closing of the circuit through electromagnets 101 or 102 also energizes the electromagnets 72 which form with their armatures 73 an electromagnetic clutch. Now open switch 146 and close switch 144. Next, operate one or the other of switches 149 and 150 until the sparks disappear, at which time the amount and angle of unbalance in the compensator counteracts the unbalance in the specimen being tested around the fixed pivot. When the switch 149 is closed, the circuit is closed through lines 172, 177 and electromagnets 85 causing friction wheel 186 to contact with friction wheel 66 to partially revolve shaft 95 and the compensator carrier in one direction; and the carrier and shaft 95 are partially revolved in a reverse direction when switch 150 is closed to close the circuit through lines 172, 179 and electromagnets 84 to cause friction wheel 79 to engage friction wheel 66. Now stop the machine at a position where the center of the compensator weight is at the indicator line on the sight window 184, see Figure 1, and read through the top of the housing 182 at the sight opening 183, the amount of unbalance as shown in ounce inches on the graduations 129, see Figure 8. Read also the angle indicated by the pointer 59 on the graduated dial 61 when the machine is stopped in this position. The crank shaft is now marked on the front over the right end pivot and in a horizontal plane through the axis of the shaft. This indicates the angular location at which material is to be removed at this end to balance the shaft.

The machine is set for a left end reading by locking the right hand end of the vibrating bed to its support by means of the handle 37 at the right end and releasing the left end by operating the handle 37 of the left spring support 6. The machine is now started by turning the main motor switch 185. Close the switch 150, see Figure 10, which returns the compensating weight 130 to neutral as to weight. Now turn on switch 145 and note on the dial 61 the center of the spark arc indicating angular location of unbalance at the left end of the specimen being tested. Turn off the switch 145 and turn on the switch 146 and determine the angular position of the compensating weight by the narrow sparking arc on the dial 61. Now operate one or the other of the switches 147 and 148 until the narrow sparking arc is in the same position as the center of the sparking arc which appeared on the dial 61 when the switch 145 was turned on. Turn off the switch 146 and turn on the switch 145. Now operate one or the other of the switches 149 and 150 until the sparking disappears from the dial 61 at which time the amount and angle of unbalance in the compensator counteracts the unbalance in the specimen being tested around the right end support. Stop the machine at the position where the center of the compensating weight is at the indicator line on the sight opening 184 of housing 182. With the machine stopped in this position, read through the top sight opening 183 of the housing 182, the amount of unbalance shown on the cylinder 107 of the compensator, and also read the angle indicated by the pointer 59 on angle indicator 61. If correction is to be made over the pivots, mark the first on the front over the left hand pivot and in a horizontal plane through the axis of the shaft. This indicates the angular location at which material is to be removed at the left end to balance the shaft.

Referring now to Figure 13, I have already explained that the graduations 129 on the compensator indicate unbalance in ounce inches. Assuming that correction for static and dynamic unbalance are to be made in two planes located over the two pivots H and J, with the pivot J locked and the pivot H unlocked and that a ten ounce inch reading is shown on the compensator, the correction which would be required in the crank shaft over pivot H is determined by $$\left(\frac{X+Y}{X}\right) \times Z = \left(\frac{20+8}{20}\right) \times 10 = 14$$

ounce inches at pivot H.

Assuming now that the pivot H is locked and the pivot J is unlocked and that the same reading, ten ounce inches of unbalance at compensator, Z, the correction that would be required in the crank shaft over the pivot J is determined by $$\frac{Y}{X} \times Z = \frac{8}{20} \times 10 = 4 \text{ ounce inches at pivot J.}$$

In the above example, the planes of correction are close to the pivots. When a large number of similar parts are to be balanced and corrected in this manner, a chart may be used to determine proper corrections for various readings from the compensator and these corrections can be specified on the chart in ounce inches or the corresponding depth of drilled holes may be indicated where metal is to be removed to balance the specimen. It will, of course, be understood that the unbalance as determined by the readings of the machine at two planes of correction can be transferred in the usual and conventional manner to other selected planes of correction.

When balancing a specimen, such as a long crank shaft, where deflection is likely to occur or where the shaft has been slightly misaligned from handling, the center guide brackets should be employed. To adjust this guide bracket the rollers are moved away a sufficient distance to clear the shaft and the bracket is clamped in position with a thin spacer plate between the front clamping surface of the bracket base and its cross bar. In this position, adjust and lock the supporting rollers so that they are just in contact with the shaft bearing. The spacer plate is then removed and the clamping screw tightened. The purpose of exerting this slight downward pressure at the center of the specimen is to prevent the center bearing of the shaft being tested from leaving the rollers of the guide bracket while being rotated. The minimum pressure necessary to hold the center bearing of the specimen to be balanced steady against the rollers of the guide bracket, should be used while the specimen is being rotated at balancing speed.

It will be apparent from the foregoing that the specimen being tested is revolved while pivotally supported in determined planes. The vibratory movement in one direction is utilized to visibly indicate by means of an electric spark the angle of unbalance of the specimen. The amount of unbalance in the specimen is compensated for by positioning a compensating weight or value at an angle to the axis of revolution of the specimen, such compensating weight being revolved during such operation at a predetermined speed relatively to that of the specimen. The unbalance is thus determined as to angle, amount and linear location at two planes of correction, so that a dynamic couple is formed which will compensate for the unbalance in the specimen, and thus enable one by removing or adding material at such locations to place the specimen in substantially perfect balance.

The compensating mechanism is provided with a variable friction drive controllable at the will of the operator to move the compensating weight in one direction or the other. The compensating mechanism also drives a rotatable contact which is effective to cause a narrow arc of sparks to be produced on the angle indicator 180° from the arc of sparks which is produced on the angle indicator when the compensator weight is in neutral position. When the weight is properly positioned to compensate for the unbalance in the specimen the sparks disappear from the angle indicator, so that the operator will know that the proper adjustment of the compensating weight has been made to place the specimen in balance.

It will now be apparent that I have devised a new and useful apparatus for balancing rotatable bodies which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:

1. In a balancing machine, a vibratory support for the specimen, means to lock said support to provide either a right or left end pivot for its vibrations, means to revolve a specimen on said support, means to visibly indicate the angle of unbalance of the specimen, a carrier revoluble with the specimen, a compensator weight capable of rectilinear movement in said carrier at an angle to its axis of revolution, a screw intergeared with said weight, and means to turn said screw in a forward or a reverse direction to position said compensating weight to indicate the mechanical couple of the unbalanced forces with respect to the locked pivot.

2. In a balancing machine, comprising a carrier revoluble in predetermined speed relationship with a revoluble specimen under test, a compensating weight having rectilinear movement in the carrier at an angle to the axis of revolution of the carrier, a screw intergeared with said weight, a friction wheel in fixed relation with said screw, and electromagnetic means controlled by the operator to drive said friction wheel in a forward or a reverse direction.

3. In a balancing machine, a compensating device comprising a carrier revolved at a predetermined speed relatively to the speed of revolution of the specimen under test, a weight carried by said carrier and movable thereon, transversely of the axis of rotation, and means including an electromagnetic clutch controllable at the will of the operator to cause said weight in any angular position it may assume during its revolution to move transversely to the axis of revolution of the specimen to position it to compensate for and determine the unbalance in the specimen.

4. In a balancing machine, a vibratory support for the specimen to be tested, means to revolve the specimen on said support, an angle indicator means controlled by the vibratory movement of said support in one direction to visibly indicate on said angle indicator an arc of sparks indicative of the angle of unbalance in the specimen, an unbalance compensator, and means under the control of the operator to indicate a second arc of sparks on said angle indicator which indicates the angular position of the unbalance compensator.

5. In a balancing machine, a vibratory support for the specimen to be tested, means to lock said support to provide a right or left end pivot for its vibrations, compensating means revoluble in predetermined relation with the specimen and having a compensating weight, means controllable at the will of the operator to move said weight transversely to the axis of the revolution of the specimen, an angle indicator, means controlled by the vibratory movement of said support and driven in predetermined timed relation with the specimen to produce an arc of sparks on said angle indicator indicative of unbalance in the specimen, and an electrical contact mechanism opened and closed during a revolution of said compensating means and operative to produce an arc of sparks on said angle indicator indicative of the angular position of the compensating weight.

6. In a balancing machine, a vibratory support for the specimen to be tested, means to revolve a specimen on said support, means to lock said support to provide a pivot for its vibrations, a graduated carrier, electromagnetic means to cause said carrier to revolve at a variable speed relatively to the revolution of said specimen, a compensator weight in said carrier, a screw engaging said weight, electromagnetic means controllable at the will of the operator to cause said screw to turn in one direction or the other, and thereby position said weight to compensate for unbalance in the specimen under test, and visibly indicate by said graduation, the amount of unbalance in the specimen.

7. In a balancing machine, a vibratory support for the specimen to be tested, means to revolve the specimen on said support, a rotatable carrier, variable speed driving mechanism driven by said specimen revolving means and controllable at the will of the operator to revolve said carrier, a compensating weight mounted in the carrier and movable in the carrier in a rectilinear path at an angle to the axis of revolution of the carrier, a screw intergeared with said weight, a friction wheel fixed relatively to the screw to revolve it, a pair of driving friction wheels, and electromagnetic means controllable at the will of the operator to cause one or the other of said pair of friction wheels to engage the friction wheel revolving the screw.

8. In a balancing machine, a vibratory support for the specimen to be tested, means to revolve a specimen on said support, a variable friction drive including a friction wheel driven in unison with the specimen, and a second friction wheel loosely mounted and adapted to be driven at a different speed from that of said first friction wheel, a carrier driven by said second friction wheel, electromagnetic means controllable at the will of the operator to cause said friction wheels to revolve in unison, electromagnetic means controllable at the will of the operator to cause a variable drive of said second friction wheel by said first friction wheel, a compensating weight in said carrier, and movable in a rectilinear path at an angle to the axis of revolution of the carrier, a screw intergeared with said weight, a friction wheel in fixed relation with the screw, a pair of driving friction wheels, and means to bring one or the other of said pair of friction wheels into engagement with the friction wheel in fixed relation with the screw.

9. In a balancing machine, compensating mechanism revoluble in predetermined speed relation with the specimen to be tested, comprising a revoluble carrier having a graduated slot, a compensating weight in said carrier, a member carried by said weight and extending into said slot and having a reference mark, a screw intergeared with said weight to move it in a rectilinear path at an angle to the axis of revolution of the carrier, a friction wheel in fixed relation with the screw, a yoke, a pair of friction wheels fixed to said yoke, and electromagnetic means to move the yoke to bring one or the other of said pair of friction wheels into engagement with said first friction wheel.

10. Compensating mechanism for a balancing machine, comprising a carrier revoluble in determined speed relationship with a specimen under test, and having a slot graduated in ounce inches, a compensator weight in the carrier movable at substantially right angles to the axis of revolution of the carrier having a shoe in said slot and provided with a reference mark, means to limit the travel of said weight in opposite directions, a screw intergeared with said weight, a friction wheel in fixed relation with the screw, a pair of driving friction wheels, and electromagnetic means controllable at the will of the operator to move one or the other of said pair of friction wheels into engagement with said first friction wheel during the revolution of the carrier.

11. Compensating mechanism for a balancing machine, comprising a carrier revoluble in determined speed relationship with a specimen under test, and having a slot graduated in ounce inches, a compensator weight movable in the carrier having a shoe in said slot and provided with a reference mark, means to limit the travel of said weight in opposite directions, a screw intergeared with said weight, electromagnetic means for controlling the turning of said screw in one direction or the other, an electric circuit controlling said electromagnetic means, and means controlled by said screw to indicate the angular position of said compensating weight.

JACOB LUNDGREN.